United States Patent [19]

Gallone

[11] Patent Number: 4,867,579

[45] Date of Patent: Sep. 19, 1989

[54] WIDELY ADJUSTABLE SLIDING UNIT FOR OPERATING MACHINES

[75] Inventor: Fiorenzo Gallone, Milan, Italy

[73] Assignee: T.M.T.-Transmissioni Meccaniche Torino, Milan, Italy

[21] Appl. No.: 294,874

[22] Filed: Jan. 10, 1989

[30] Foreign Application Priority Data

Jan. 22, 1988 [IT] Italy ............................... 19171 A/88

[51] Int. Cl.$^4$ ............................................. F16C 29/04
[52] U.S. Cl. ......................................... 384/53; 384/9; 384/55; 384/57; 384/58
[58] Field of Search ....................... 384/53, 55, 57, 58, 384/40, 59, 9

[56] References Cited

U.S. PATENT DOCUMENTS

| | | | |
|---|---|---|---|
| 2,185,304 | 1/1940 | Knapp | 384/53 |
| 2,525,712 | 10/1950 | Neighbour | 384/57 |
| 4,375,195 | 3/1983 | Tsuboi | 384/58 |
| 4,623,201 | 11/1986 | Gallone | 384/55 |

*Primary Examiner*—Lenard A. Footland
*Attorney, Agent, or Firm*—Roberts, Spiecens & Cohen

[57] ABSTRACT

A sliding unit adjustable within wide limits for operating machines comprising at least one hollow guide made from an extruded structural shape installed inside supporting elements equipped with revolving elements, which cooperate with sliding surfaces of the hollow guide, with the support elements being positioned on portions of a base plate which can be adjusted both in height, and in the transversal direction relatively to said hollow guide.

10 Claims, 5 Drawing Sheets

WIDELY ADJUSTABLE SLIDING UNIT FOR OPERATING MACHINES

The present invention relates to a sliding unit adjustable within wide limits, for operating machines.

Providing sliding units composed by at least one hollow guide, made from an extruded structural shape, installed inside support elements, wherein the sliding support elements comprise brackets or arms, constrained to a base, and bear revolving elements, such as rolling bearings or rollers, which cooperate with sliding surfaces of the hollow guide, is known.

Such sliding units, as disclosed, e.g., in the U.S. Pat. No. 4,623,201 had to be positioned on a surface machined to a good-precision finishing by means of a machine tool, and, above all, did not make it possible the support elements to be easily and quickly adjusted in position, once that the hollow guide was inserted.

Such a matter of fact could cause difficulties in positioning, and needs for further adjustments, to be carried out in order to obtain an alignment of the revolving elements of the various support elements relatively to the sliding surfaces of the hollow guide, also considering that the hollow guide can be of the type composed by a plurality of butt-connected bars.

Furthermore, on the operating machines, when sliding units of the above described type are used, the fastening is allowed of complementary arms or elements, such as clamps, control racks, and so forth, onto the sides of the hollow guide or bar. This positioning constitutes a penalizing element in the so-said "robogate" systems, in which the saddles of the welding presses have such a width as to occupy the whole room comprised between the guides.

A purpose of the present invention is of providing a sliding unit of the above described type, which makes it possible the said sliding unit to be rapidly and easily adjusted in position, also with the hollow guide being inserted between the support elements, and even in the presence of supporting surfaces of the unit, and/or of a plurality of units, not endowed with a high finishing precision, such as the commercial laminates or structural shapes may be.

Furthermore, the shape of the support elements which support the same guide must be such as to make it possible a various and universal fastening to be accomplished, of tool machine elements and various machining fittings, according to the geometry of, and the available room in, the operating machine, in order to achieve, in such a way, the possibility of an adjustment within wide limits of the whole sliding unit.

These purposes according to the present invention are achieved by providing a widely-adjustable sliding unit of the type which comprises at least one hollow guide made from an extruded structural shape installed inside the interior of at least one support element provided with two arms transversely positioned on opposite sides relatively to said hollow guide, with four revolving elements being provided on said at least one support element, which cooperate with at least four external sliding surfaces of said hollow guide, characterized in that said at least two arms extend from a base plate and are opposite to each other, that said at least four revolving elements are subdivided into two pairs of revolving elements, are opposite to said hollow guide, and are respectively positioned: a first pair, to free ends of said at least two arms opposite to each other; and a second pair, on said base plate; and that said base plate furthermore comprises three plate portions kept fastened together, superimposed to one another and sliding relatively to one another, with respective mutually adjacent and superimposed pairs of said plate portions being both prevented: from separating from each other in a direction perpendicular to said base plate; and from moving by a mutual shifting motion: a first pair of adjacent superimposed plate portions, according to a direction transversal relatively to said hollow guide; and a second pair of adjacent superimposed plate portions, according to a longitudinal direction parallel to said hollow guide; with said motions in the transversal direction and in the longitudinal direction of said pairs of adjcent portions being each determined by a coupling of the eccentric pin-slot type, which can be actuated from the outside.

The structural and functional characteristics, and the advantages of a sliding unit according to the invention will be better understood from the following exemplifying and non-limitative disclosure, referred to the relevant schematic drawings, wherein.

Figure 1:
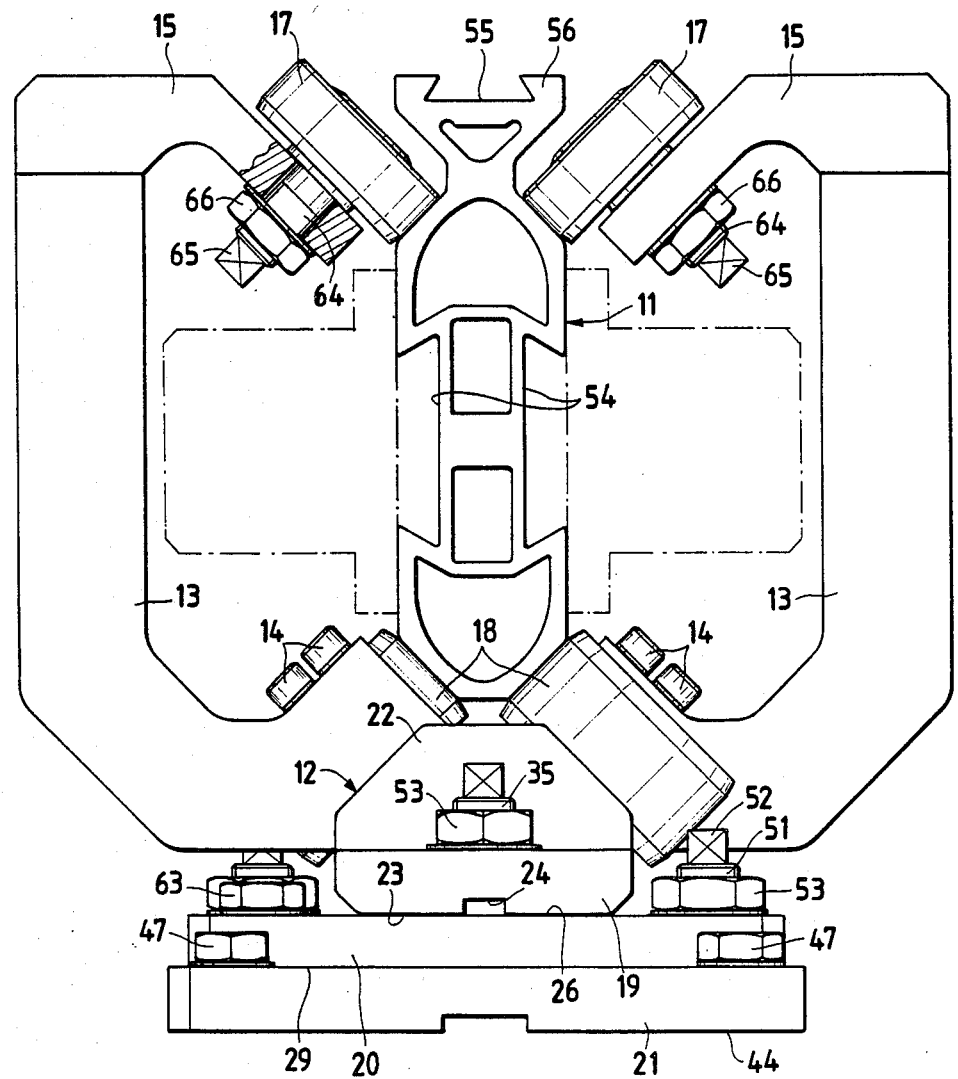
FIG. 1 shows a frontal elevation view of a sliding unit according to the present invention.
Figure 2:
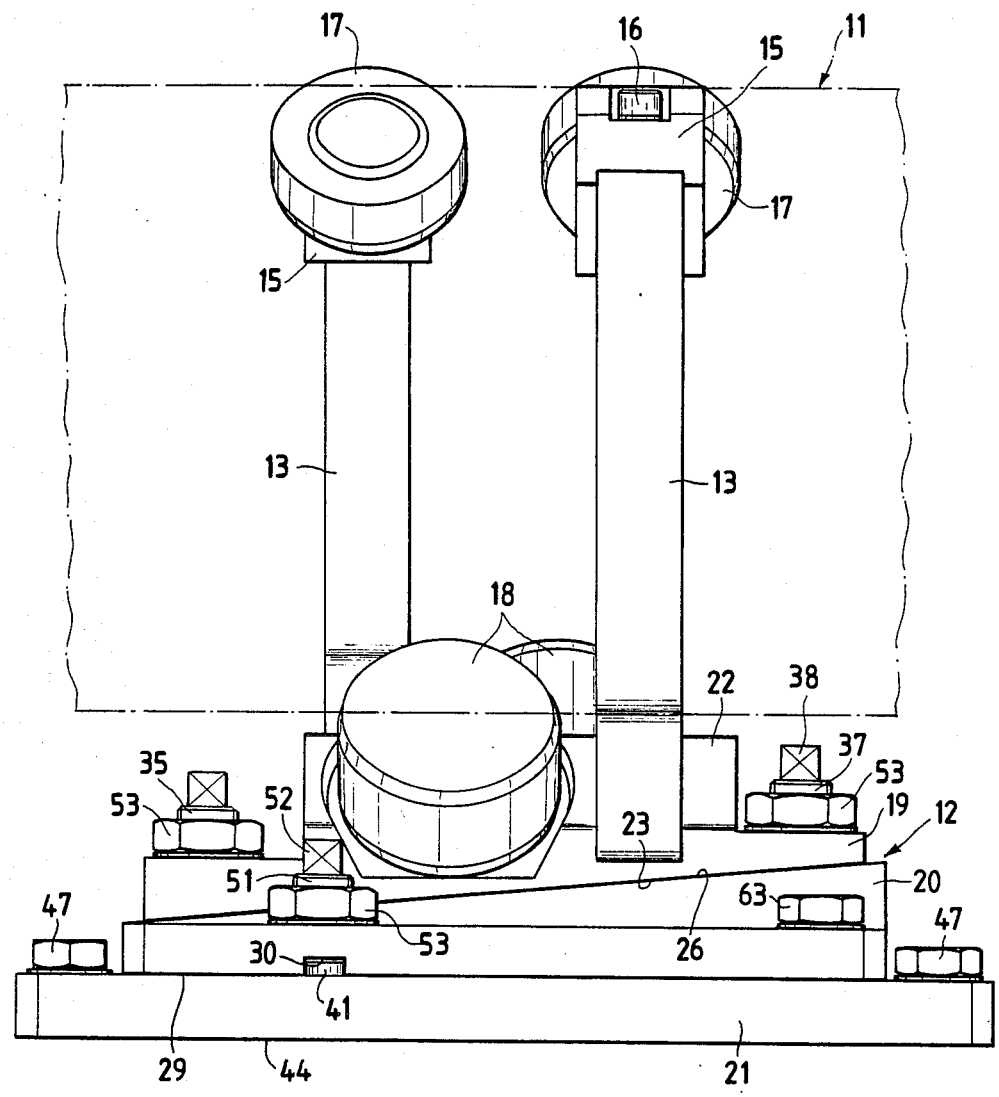
FIG. 2 shows a side elevation view of the sliding unit of FIG. 1, with the hollow guide being shown in chain line.
Figure 3:
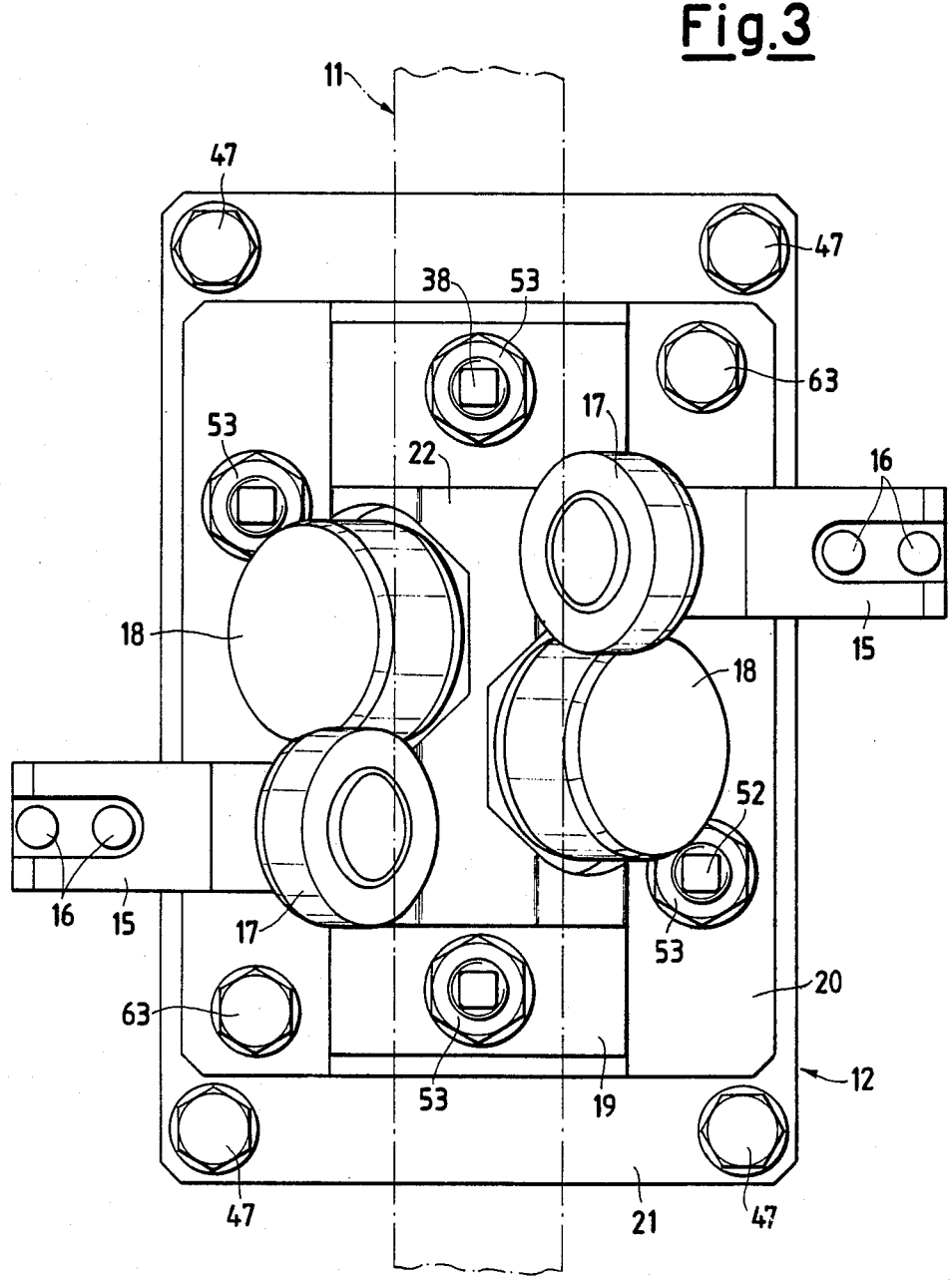
FIG. 3 shows a top plan view of the sliding unit of FIG. 1, with the hollow guide being shown in chain line.
Figure 4:
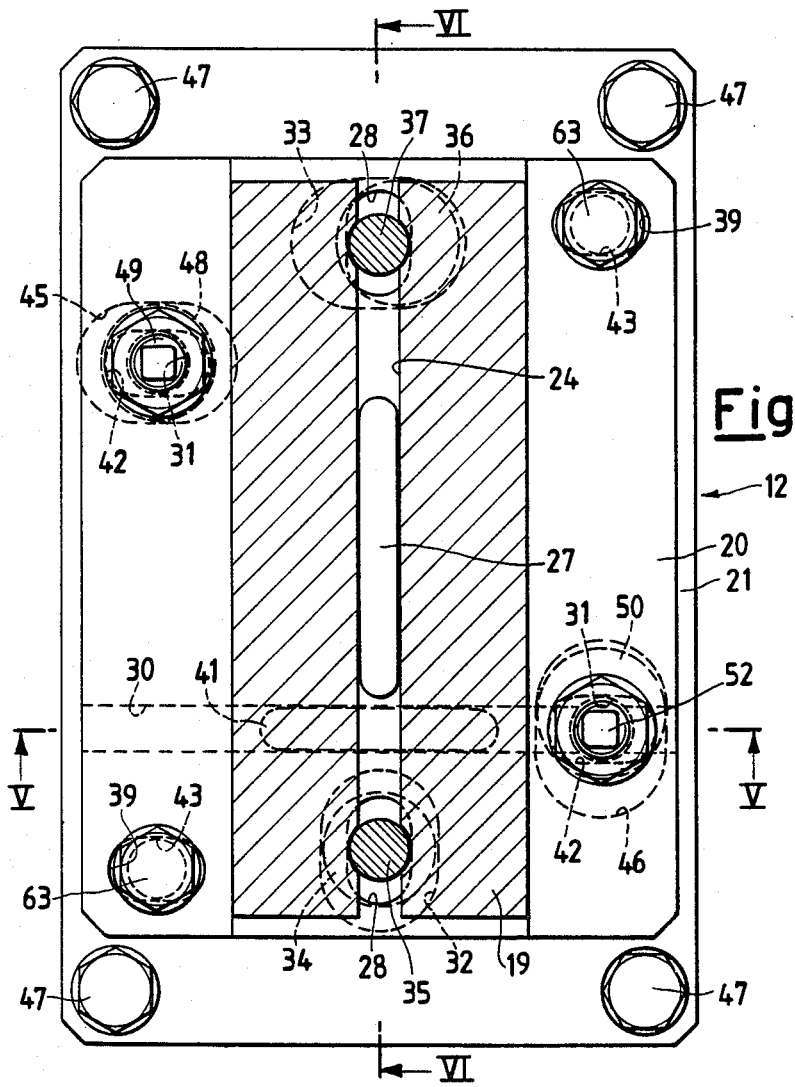
FIG. 4 shows a partially sectional top plan view of the support element supporting the sliding unit of FIG. 1.

Referring to the figures, a sliding unit comprises at least one support element, inside which a hollow guide 11 is installed, with the one being sliding relatively to the other, and vice-versa.

The hollow guide 11, or bar, is provided, e.g., with an octagonal outline of the cross section, from a high-temperature-or cold-extruded aluminum alloy material, submitted to a treatment of hard anodic oxidation, which improves the characteristics of surface hardness of the hardened and tempered aluminum alloy, while simultaneously securing the highest slidability to the contact surfaces.

The support element comprises a base plate, generally indicated by the reference numeral 12, from which two arms 13 extend, which are constrained to it by means of screws 14, and bear, on their end portions 15, which are free and removable thanks to the presence of coupling screws 16, a first pair of revolving elements 17, such as rollers or rolling bearings.

A second pair of revolving elements 18, equal to the revolving elements 17, are positioned integral with said base plate 12. Said two arms 13 and the two pairs of revolving elements 17 and 18 are positioned transversely relatively to said longitudinal hollow guide 11, and the mutually opposite revolving elements 17, 18 have their parallel axes inclined at 45°, so as to interact on four surfaces, essentially two-by-two opposite and parallel, of the octagonal-outline structural shape.

The base plate 12 comprises three plate portions 19, 20, 21, mutually superimposed and sliding relatively to one another, which are prevented from vertically separating from one another along a direction perpendicular to the same base plate, as well as from moving, by mutual movement: a first pair of mutually superimposed and adjacent plate portions 19 and 20, according to a transversal direction relatively to said hollow guide 11; and a second pair of mutually adjacent and superimposed plate portions 20 and 21, according to a longitudinal direction, parallel to said hollow guide 11.

The first plate portion 19, or upper portion viewing at the FIGS. from 1 to 3, has an upwards-protruding body with an hexagonal cross-section 22, on which the two arms 13 are installed staggered relatively to each other, positioned with their axes, and with the axes of the revolving elements 17, on a pair of planes parallel to each other, and transversal relatively to the hollow guide 11.

The arms 13 and the relevant revolving element 17 are opposite to a respective revolving element 18 directly positioned on said hexagonal-cross-section body 22 of said first plate portion 19. The bottom surface of the first plate portion 19 is machine-finished according to an inclined-plane surface 23, on which a key spline 24 is provided, with said slope "β" being slightly angularly shifted relatively to the longitudinal direction of movement of the hollow guide 11. On opposite end areas of said inclined-plane surface 23, a pair of through-bores 25 are provided, which have their axes perpendicular to the base plate 12, and run through the axis of the key spline 24.

The second plate portion 20, i.e., the intermediate plate portion, is provided with an upper inclined-plane surface 26, complementary to the inclined-plane bottom surface 23 of the upper plate portion 19, with which it mates, on which a key 27 is installed, which is suitable for entering, and sliding inside, the key spline 24. On opposite sides relatively to said key 27, longitudinally aligned to said key 27, a pair of slots 28 are provided, whith run vertically through the second plate portion 20. On a bottom surface 29 a further key spline 30 is provided, according to a horizontal direction transversal relatively to said hollow guide 11. The slots 28 are surrounded, on the bottom surface 29, by relevant countersunk slots of larger size, with a first countersunk slot 32 being concentric to the same slot 28, and a second countersunk slot 33 having the same size as of the slot 32, and being turned by 90° relatively to the slot 28 it surrounds.

Figure 6:
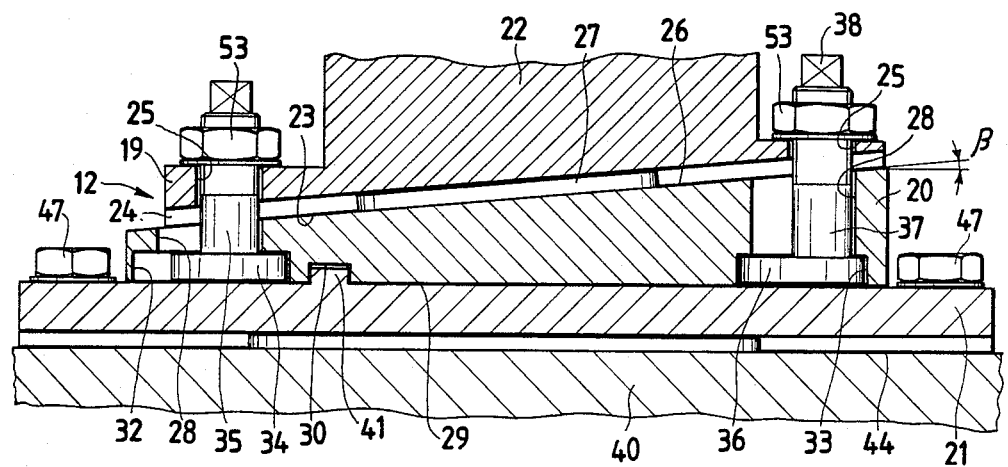
FIG. 6 shows a transversal sectional view according to path VI—VI of FIG. 4, also in a different operating position.

Inserted inside the first countersunk slot 32 is the circular, flat, enlarged head 34 of a screw 35 which acts as the link element which connects the first portion 19 of the base plate 12 to the second portion 20 of the base plate 12, while in the mean time allowing a guided movement in the longitudinal direction of both said portions, or, better, a movement of the first plate portion relatively to the second, underlying, plate portion (see FIG. 6). Inside the second countersunk slot 33, the circular, flat, enlarged head 36 enters, which is integral with, and eccentric relatively to, a screw 37, which is provided with an upper free end having a square cross-section 38 suitable for acting as an actuation means, with said square-shaped cross-section 38 protruding from the base plate 12, and being used in order to produce, by means of a staggered displacement of the plate portions, a movement of rising, or of sinking, of the body with hexagonal-shaped cross-section 22 bearing the revolving elements 17, 18.

On the second base plate portion 20, at both sides relatively to the inclined-plane surface 26, slots 39 are furthermore provided nearly in correspondence of two first mutually opposite corners, and, in correspondence of further two mutually-opposite corners, bores 31 are provided, with all of said bores being through-bores; inside them, hereinunder disclosed screw elements will enter, in order to constrain said second plate portion 20 relatively to the third plate portion 21; it should be observed that one of said bores 31 runs through the key spline 30.

The third plate portion, or bottom plate portion, 21 is of flat type, and is provided with a top key 41 running in a transversal direction relatively to the hollow guide 11, and suitable for entering, and sliding inside, a key spline 30 opposite to it, and provided on the bottom surface 29 of the second plate portion 20.

On said third plate portion 21, a pair of slots 42 are furthermore provided, with said slots 42 being through-slots, and being positioned in the transversal direction, i.e., parallel to the key 41, and essentially aligned to both overhanging bores 31, and a pair of screw-threaded through-bores 43 being provided as well, which are respectively aligned to both slots 39, and receive fastening screws 63 for fastening said second plate portion 20 relatively to said third plate portion 21.

On a bottom surface 44 of said third plate portion 21, a first slot of the slots 42 is surrounded by a larger-size countersunk slot 45 concentric to said first slot 42, whilst a second slot 42 is provided with a countersunk slot 46, which has the same size as of the countersunk slot 45, but is turned by 90° relatively to same second slot 42.

A series of four further through-bores (not shown in the figures) receive screws 47, which make it possible the whole base plate 12 to be fastened to a whatever support plane, or to the bedplate of a complementary tool-carrier element partially shown in a schematic way in 40.

Also in this case, a first countersunk slot 45 is destined to receive the circular, flat, enlarged head 48 of a screw 49, which screw 49 acts as the linking means between the second portion 20 of the base plate 12 and the third portion of the base plate 12, allowing a guided displacement in the transversal direction of said two plate portions (FIG. 5) to take place. Inside the second countersunk slot 46, a circular, flat, enlarged head 50 enters, which is positioned integral with, and eccentric relatively to, a screw 51, which is provided with an upper free end having a square cross-section 52 suitable for acting as an actuation means, with said square-shaped cross-section 52 protruding from said base plate 12, and being used in order to produce, by means of a staggered displacement of the plate portions 20 and 21, a movement of transversal adjustment.

All of the above said screws 35, 49 and eccentric screws 37, 51 are tightened in order to restrain the relevant portions 19, 20 and 21 of the base plate 12 by means of nuts 53 and relevant washers, which nuts, when loosened, make it possible the adjustment movements to take place, and, when tightened, realize the required positioning of the sliding unit.

Figure 5:
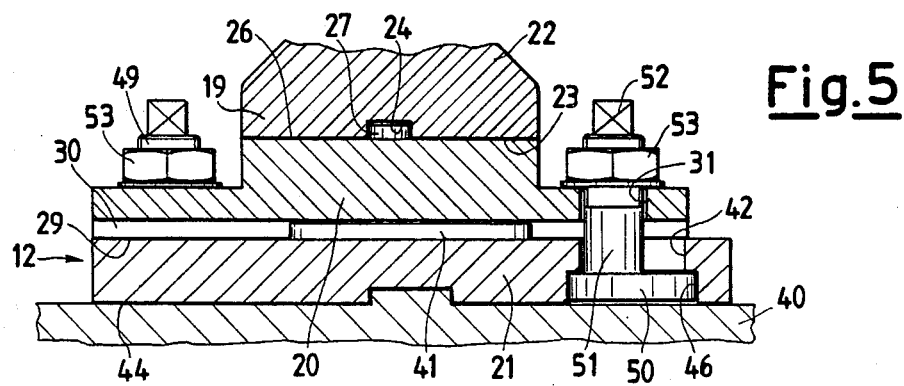
FIG. 5 shows a transversal sectional view according to path V—V of FIG. 4 in a different operating position.

The size of the flat circular heads having a slightly smaller diameter than of the shortest diagonal of the countersunk slots, so that they can rotate and slide inside said slots, with simultaneously, in case of the eccentrically-positioned circular heads, determining the movement of the plate portions, as shown in FIGS. 5 and 6.

It is furthermore interesting to observe that the hollow guide 11 shown in FIG. 1 is also provided, besides the longitudinal side grooves 54, with a further longitudinal groove 55 provided on an upper protruding portion 56 of the octagonal-outline structural shape. The provision of the above-said top groove 55 makes it possible auxiliary elements or mechanisms, tool-carrier arms, etc., to be fastened, without causing a side hindrance, thus allowing the whole width of the robogate systems to be exploited. In this case, the available room can be furthermore taken advantage of, by using simple "I"-shaped arms 13, instead of using such "C"-shaped arms as shown in the figures.

Figure 7:
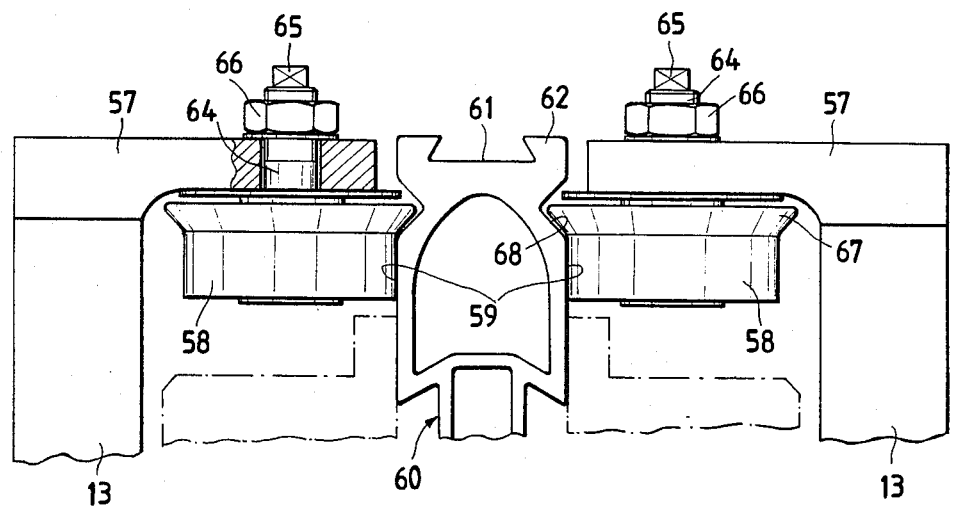
FIG. 7 shows a further exemplifying form of practical embodiment of the free ends of the support element and of the hollow guide of a sliding unit according to the invention.

It should be furthermore observed that the end portions 15 can be replaced, by removing the screws 16, with further end portions 57 (FIG. 7), bearing further, vertical-axis revolving elements 58, which act on side surfaces 59 of a further hollow guide 60, partially shown and having a different outline, but which also allows, by means of a longitudinal groove 61, provided on an upper protruding portion 62, elements, arms for auxiliary mechanisms or tool-carriers, to be fastened. Said further revolving elements 58, or rollers, are furthermore provided with a circular, protruding perimetrical edge 67 which enters a suitable groove 68 purposely provided along the longitudinal direction in the hollow guide 60, in order to prevent sane hollow guide 60 from being accidentally removed upwards.

A further adjustment can be carried out on a sliding unit according to the present invention, by acting on the upper revolving elements 17 and/or 58, which are provided with eccentric-pin screws 64, which in general are preadjusted as a function of the outline od the hollow guide 11 and/or 60. In them, the position of said eccentric-pin screws is defined by means of a reference element, e.g. a drop of a coloured paint. Normally, no need exists for the adjustment of the upper revolving elements 17, 58 to be changed, but anyway this additional possibility is supplied too, in order to meet with particular cases, in which a higher precision in hollow guide 11, 60 positioning could be required.

A purposely provided notch, not shown in the figures, provided at the end of a square tang 65 provided on each eccentric-pin screw 64, which is fastened by means of a nut 66, shows, when is aligned with the longitudinal axis of the support element, the middle position of the eccentricity.

In a sliding unit according to the present invention, a vertical and horizontal adjustment can be hence carried out, by means of coupled and overlapped plate portions, which accomplish a system composed by saddles with complementary and mutually opposite inclined and horizontal planes, the slidings of which are guided by relevant longitudinal and transversal keys.

Said adjustment systems can be simultaneously actuated, in order to offer easeness and rapidity of alignment of the revolving elements, or rollers, of each support element relatively to other support elements, even when the hollow guide is already inserted between the support elements.

The sliding unit according to the present invention, provided with said vertical and transversal adjustment system, gives the user a greater easeness of adjustment, and makes it possible support surfaces relatively to the outside to be used, which are finished with a lower precision, such as to make it possible the finishing on the machine tool to be got rid of, with an evident and considerably possibility of costs saving. In fact, the optical and mechanical alignment of the revolving units of each support element can be achieved, in spite of possibilities of errors in the positioning of the support planes to which the support elements are fastened.

I claim:

1. Widely-adjustable sliding unit of the type which comprises at least one hollow guide made from an extruded structural shape installed inside the interior of at least one support element provided with two arms transversely positioned on opposite sides relatively to said hollow guide, with four revolving elements being provided on said at least one support element, which cooperate with at least four external sliding surfaces of said hollow guide, characterized in that said at least two arms extend from a base plate and are opposite to each other, that said at least four revolving elements are subdivided into two pairs of revolving elements, are opposite to said hollow guide, and are respectively positioned: a first pair of revolving elements, to free ends of said at least two arms opposite to each other; and a second pair of said revolving elements, on said base plate; and that said base plate furthermore comprises three plate portions kept fastened together, superimposed to one another and sliding relatively to one another, with respective mutually adjacent and superimposed pairs of said plate portions being both hindered: from separating from each other in a direction perpendicular to said base plate; and from moving by a mutual shifting motion: a first pair of adjacent superimposed portions, according to a direction transversal relatively to said hollow guide; and a second pair of adjacent superimposed plate portions, according to a longitudinal direction parallel to said hollow guide; with said motions in the transversal direction and in the longitudinal direction of said pairs of adjcent portions being each determined by a coupling of the eccentric pin-slot type, which can be actuated from the outside.

2. Sliding unit according to claim 1, characterized in that said hollow guide is provided at its top with a longitudinal protruding portion provided with an also longitudinal groove.

3. Sliding unit according to claim 1, characterized in that said first pair of adjacent superimposed plate portions prevented from moving relatively to each other according to a transversal direction, are provided with opposite, inclined-plane, complementary surfaces, which are respectively provided: the one of them, with a key; and the other one, with a key spline, positioned with a slope "$\beta$" in the longitudinal direction, so that a relevant eccentric pin-slot coupling also causes a shift in the vertical direction, of said at least one support element.

4. Sliding unit according to claim 1, characterized in that each eccentric pin-slot coupling provided between two superimposed adjacent plate portions comprises at least an enlarged, eccentric head screw running through a first through-slot provided through a plate portion, and through a through-bore running through the other plate portion, with said one plate portion and other plate portion being kept coupled by said enlarged head, and a nut fastened on said eccentric, enlarged head screw, with said plate portion being provided with a first slot inside which said enlarged, eccentric head is positioned with possibility of movement, with said first slot being furthermore countersunk and turned by 90° relatively to said first through-slot, besides being aligned to, and having a larger size than, said first slot.

5. Sliding unit according to claim 4, characterized in that inside both of said overlapped and adjacent plate portions, at least one further enlarged-head screw is positioned, with said first plate portion bearing a second slot running through a second through-slot provided through a plate portion, and inside a through-bore provided on the other plate portion, with said first plate portion and said second plate portion bein kept coupled by said enlarged head, and a nut screwed down on said enlarged-head screw, with said one plate portion being provided with a second slot, inside which said enlarged head is positioned with possibility of movement, with said second slot being furthermore countersunk, and concentric to said second slot, besides being aligned to, and having a larger size than, said second slot, with said second slot being parallel to said first slot.

6. Sliding unit according to claim 4, characterized in that a free end of said enlarged, eccentric head screw has a square-shaped cross-section, suitable for acting as an actuation means for said screw.

7. Sliding unit according to claim 1, characterized in that said first pair of revolving elements have vertical axes, and cooperate with vertical side surfaces of said hollow guide.

8. Sliding unit according to claim 1, characterized in that said four revolving elements have their axes inclined at 45°, with the axes of a revolving element of said first pair of revolving elements, and of a revolving element of said second pair of revolving elements opposite to said revolving element of the first pair of revolving elements, being parallel to each other.

9. Sliding unit according to claim 1, characterized in that said first pair of revolving elements are positioned on eccentric-pin screws suitable for being fastened to said end portions, in the selected eccentric position, by means of nuts.

10. Sliding unit according to claim 1, characterized in that said at least two arms and said second pair of revolving elements are positioned on a body having an hexagonal-shaped cross-section protruding upwards from one of said three plate portions.

* * * * *